(12) United States Patent
Li (10) Patent No.: US 11,947,819 B2
(45) Date of Patent: Apr. 2, 2024

(54) METHOD AND SYSTEM FOR TESTING CONVERSION RELATIONSHIP BETWEEN BLOCK READING AND PAGE READING IN FLASH MEMORY CHIP

(71) Applicant: INSPUR SUZHOU INTELLIGENT TECHNOLOGY CO., LTD., Jiangsu (CN)

(72) Inventor: Dong Li, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/040,299

(22) PCT Filed: May 27, 2021

(86) PCT No.: PCT/CN2021/096251
§ 371 (c)(1),
(2) Date: Feb. 2, 2023

(87) PCT Pub. No.: WO2022/037168
PCT Pub. Date: Feb. 24, 2022

(65) Prior Publication Data
US 2023/0297263 A1    Sep. 21, 2023

(30) Foreign Application Priority Data
Aug. 21, 2020  (CN) .......................... 202010850427.6

(51) Int. Cl.
*G06F 3/06* (2006.01)
(52) U.S. Cl.
CPC ............ *G06F 3/064* (2013.01); *G06F 3/0619* (2013.01); *G06F 3/0679* (2013.01)
(58) Field of Classification Search
None
See application file for complete search history.

(56) References Cited

U.S. PATENT DOCUMENTS 8,996,957 B1 * 3/2015 Northcott .......... H03M 13/2906
    714/763
9,183,085 B1 * 11/2015 Northcott ............ G06F 11/1012
(Continued)

FOREIGN PATENT DOCUMENTS

| CN | 106776095 A | 5/2017 |
| CN | 107705814 A | 2/2018 |

(Continued)

OTHER PUBLICATIONS

E. Yaakobi, J. Ma, L. Grupp, P. H. Siegel, S. Swanson and J. K. Wolf, "Error characterization and coding schemes for flash memories," 2010 IEEE Globecom Workshops, Miami, FL, USA, 2010, pp. 1856-1860, doi: 10.1109/GLOCOMW.2010.5700263. (Year: 2010).*

(Continued)

*Primary Examiner* — Daniel F. McMahon
(74) *Attorney, Agent, or Firm* — Dennemeyer & Associates LLC; Victoria Friedman (57) ABSTRACT

A method and device for testing a conversion relationship between different reading manners in a flash memory chip and a readable storage medium are provided. Block reading is respectively performed, a bit error rate file is recorded, a test starting point, a test ending point and a test step length are is set in a block, the bit error rate file of the number of times of corresponding page reading is respectively recorded, and the number of times of page reading that is closest to the proportion of block error codes are found from the proportion of page error codes, a conversion of the number of times of block reading and the number of times of page reading is completed, conversion coefficients of the block reading and the page reading can be calculated for blocks in different states of a life cycle.

20 Claims, 3 Drawing Sheets

(56) References Cited

U.S. PATENT DOCUMENTS

| | | | |
|---|---|---|---|
| 10,162,540 B2* | 12/2018 | Dawirs | G06F 12/0246 |
| 2001/0004326 A1* | 6/2001 | Terasaki | G11C 29/16 |
| | | | 257/679 |
| 2008/0126678 A1* | 5/2008 | Mizushima | G11C 16/349 |
| | | | 711/E12.008 |
| 2008/0209294 A1 | 8/2008 | Brink et al. | |
| 2010/0241914 A1* | 9/2010 | Chen | G11C 29/16 |
| | | | 711/E12.001 |
| 2013/0044542 A1* | 2/2013 | Huang | G11C 16/10 |
| | | | 365/185.03 |
| 2014/0089765 A1* | 3/2014 | Xing | G06F 11/1068 |
| | | | 714/773 |
| 2016/0342344 A1 | 11/2016 | Kankani et al. | |
| 2019/0171381 A1 | 6/2019 | Ioannou et al. | |
| 2020/0192735 A1 | 6/2020 | Ioannou et al. | |

FOREIGN PATENT DOCUMENTS

| | | |
|---|---|---|
| CN | 108682442 A | 10/2018 |
| CN | 111324283 A | 6/2020 |
| CN | 112069004 A | 12/2020 |

OTHER PUBLICATIONS

Y. Cai, S. Ghose, E. F. Haratsch, Y. Luo and O. Mutlu, "Error Characterization, Mitigation, and Recovery in Flash-Memory-Based Solid-State Drives," in Proceedings of the IEEE, vol. 105, No. 9, pp. 1666-1704, Sep. 2017, doi: 10.1109/JPROC.2017.2713127. (Year: 2017).*

International search report for PCT/CN2021/096251 dated Aug. 26, 2021.

Search report for Chinese application No. 202010850427.6 filed Aug. 21, 2020.

* cited by examiner

METHOD AND SYSTEM FOR TESTING CONVERSION RELATIONSHIP BETWEEN BLOCK READING AND PAGE READING IN FLASH MEMORY CHIP

CROSS-REFERENCE TO RELATED APPLICATIONS

This is a 35 U.S.C. 371 National Stage Patent Application of International Application No. PCT/CN2021/096251, filed May 27, 2021, which claims priority to Chinese application 202010850427.6, filed Aug. 21, 2020, each of which is hereby incorporated by reference in its entirety.

TECHNICAL FIELD

The present disclosure relates to the technical field of server storage, and in particular, to a method and system for testing a conversion relationship between block reading and page reading in a flash memory chip.

BACKGROUND

A flash memory chip has many advantages as a memory device, such as a large capacity, a high read-write speed and a relatively low price, and thus is widely used in some embedded products, USB flash disks and particularly SSDs (Solid State Drives, solid state drives). However, the flash memory chip has the characteristic of reading interference, that is, as the number of times of block reading is increased, a BER (Bit Error Rate, bit error rate) increases, and when the number of times of reading reaches a certain value, ECC (Error Correcting Code, error correcting code) verification fails, a data failure occurs, and at this time, the data can only be recovered by other means, thus affecting the efficiency. In order to reduce the number of times of calling in an error recovery process, when the number of times of block reading reaches a certain value, the data is migrated once so as to eliminate the influence of interference.

Flash memory chip manufacturers generally define reading interference reliability according to the number of times of block reading, but in actual use, for example, in an SSD, most application scenarios are page reading, that is, the data of one block is scarcely read at a time. Therefore, there is a conversion from the number of times of page reading to the number of times of block reading, so as to judge whether a threshold value of data migration is reached.

At present, a relatively simple method is to deem the weights of block reading and page reading to be the same, for example, if there are 1000 pages in one block, then 1000 times of page reading are converted into one time of block reading, the number of times of block reading may be approximately estimated in this calculation mode, but the accuracy of the result is low.

SUMMARY

An embodiment of the present disclosure provides a method for testing a conversion relationship between block reading and page reading in a flash memory chip. The method includes:

S1, a random number is written to obtain a test sample block, M times of block reading are performed on the test sample block, first BER information is recorded, and the first BER information is stored as a block reading bit error rate file;

S2, a test starting point value, a test ending point value and a test step length value are determined, pages from N pages in the block are randomly selected, page reading of which the number of times is equal to the test starting point value are performed, second BER information is recorded, and the second BER information is stored as a page reading bit error rate file;

S3, pages re randomly selected, page reading of which the number of times is equal to the test step length value are performed, third BER information is recorded, and the third BER information is stored as a page reading bit error rate file; and the S3 is repeatedly executed for the number of times of $$\frac{\text{the test ending point value} - \text{the test starting point value}}{\text{the test step length value}};$$

S4, the block reading bit error rate file and a plurality of the page reading bit error rate files are analyzed, a bit error rate threshold value is set, the number of bit error rates greater than the threshold value in the block reading bit error rate file and a proportion P_br as reference values are calculated; and the number of bit error rates greater than the threshold value in each of the plurality of the page reading bit error rate files and a proportion P_pr_num are calculated, and in a case that the difference value between the P_br and P_pr_num is the minimum, the number of times of page reading PR_num_similar is recorded under the page reading bit error rate file; and S5, a conversion coefficient of block reading and page reading at the current number of times of erasure is calculated.

In some embodiments, the test starting point value is 0.5*M*N, the test ending point value is 2*M*N, and the test step length value is 10*N.

In some embodiments, before the page reading is performed, the test sample block needs to be erased once, so as to eliminate reading interference.

In some embodiments, a calculation formula of the conversion coefficient is:

$$\alpha = \frac{\text{PR\_num\_similar}}{N}.$$

An embodiment of the present disclosure further provides a system for testing a conversion relationship between block reading and page reading in a flash memory chip. The system includes:

a block reading component, configured to write a random number to obtain a test sample block, perform M times of block reading on the test sample block, record first BER information, and store the first BER information as a block reading bit error rate file;

a page reading component, configured to determine a test starting point value, a test ending point value and a test step length value, randomly select pages from N pages in the block, perform page reading of which the number of times is equal to the test starting point value, record second BER information, and store the second BER information as a page reading bit error rate file; and randomly select pages, perform page reading of which the number of times is equal to the test step length value, record third BER information, store the third BER information as a plurality of page reading bit error rate files, and repeatedly execute the operations for the number of times of $$\frac{\text{the test ending point value} - \text{the test starting point value}}{\text{the test step length value}};$$

a page reading number acquisition component, configured to analyze the block reading bit error rate file and the plurality of the page reading bit error rate files, set a bit error rate threshold value, calculate the number of bit error rates greater than the threshold value in the block reading bit error rate file, and a proportion P_br as reference values; and calculate the number of bit error rates greater than the threshold value in each of the plurality of the page reading bit error rate files, and a proportion P_pr_num, and in a case that the difference value between the P_br and P_pr_num is the minimum, record the number of times of page reading PR_num_similar under the page reading bit error rate file; and a conversion component, configured to calculate a conversion coefficient of the block reading and the page reading at the current number of times of erasure.

In some embodiments, the test starting point value is 0.5*M*N, the test ending point value is 2*M*N, and the test step length value is 10*N.

In some embodiemnts, before the page reading is performed, the test sample block needs to be erased once, so as to eliminate reading interference.

In some embodiemnts, a calculation formula of the conversion coefficient is:

$$\alpha = \frac{\text{PR\_num\_similar}}{N}.$$

An embodiment of the present disclosure further provides a device for testing a conversion relationship between block reading and page reading in a flash memory chip, including:
a memory, configured to store a computer program; and
a processor, configured to execute the computer program, so as to implement operations of the method for testing the conversion relationship between the block reading and the page reading in the flash memory chip.

An embodiment of the present disclosure further provides a readable storage medium, for storing a computer program, wherein when executed by a processor, the computer program implements operations of the method for testing the conversion relationship between the block reading and the page reading in the flash memory chip.

DETAILED DESCRIPTION OF THE EMBODIMENTS

In order to clearly illustrate the technical features of the present solution, the present disclosure will be described in detail below by way of specific embodiments and in combination with the drawings. The following disclosure provides many different embodiments or examples for implementing different structures of the present disclosure. In order to simplify the disclosure of the present disclosure, components and settings of specific examples are described below. In addition, the present disclosure may repeat reference numerals and/or letters in different examples. This repetition is for the purpose of simplicity and clarity and does not in itself dictate a relationship between the various embodiments and/or settings discussed. It should be noted that, the components illustrated in the drawings are not necessarily drawn to scale. The present disclosure omits the descriptions of well-known components and processing techniques and processes, so as to avoid unnecessarily limiting the present disclosure.

A method and system for testing a conversion relationship between block reading and page reading in a flash memory chip provided in the embodiments of the present disclosure will be described in detail below in combination with the drawings.

Figure 1:
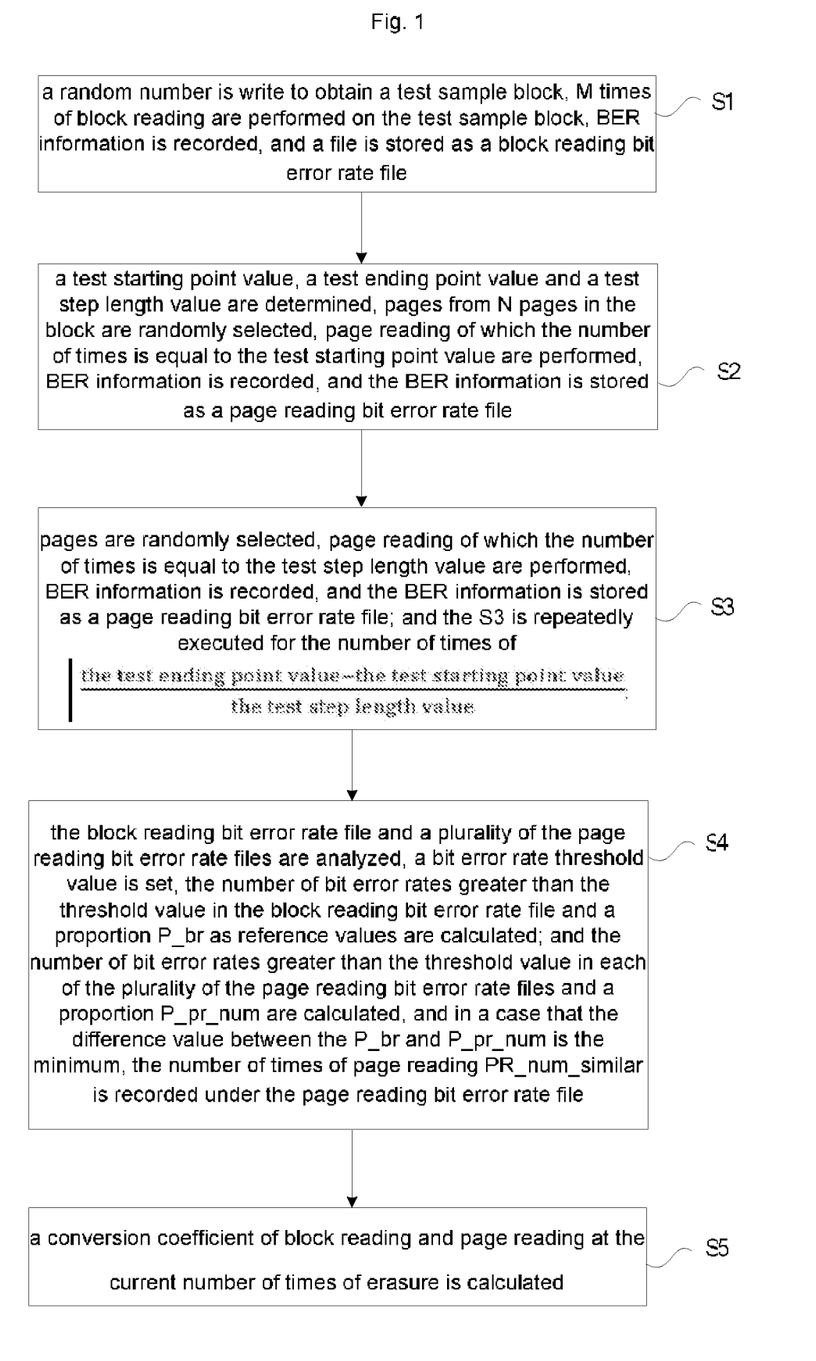
FIG. 1 is a flowchart of a method for testing a conversion relationship between block reading and page reading in a flash memory chip provided in an embodiment of the present disclosure.
Figure 2:
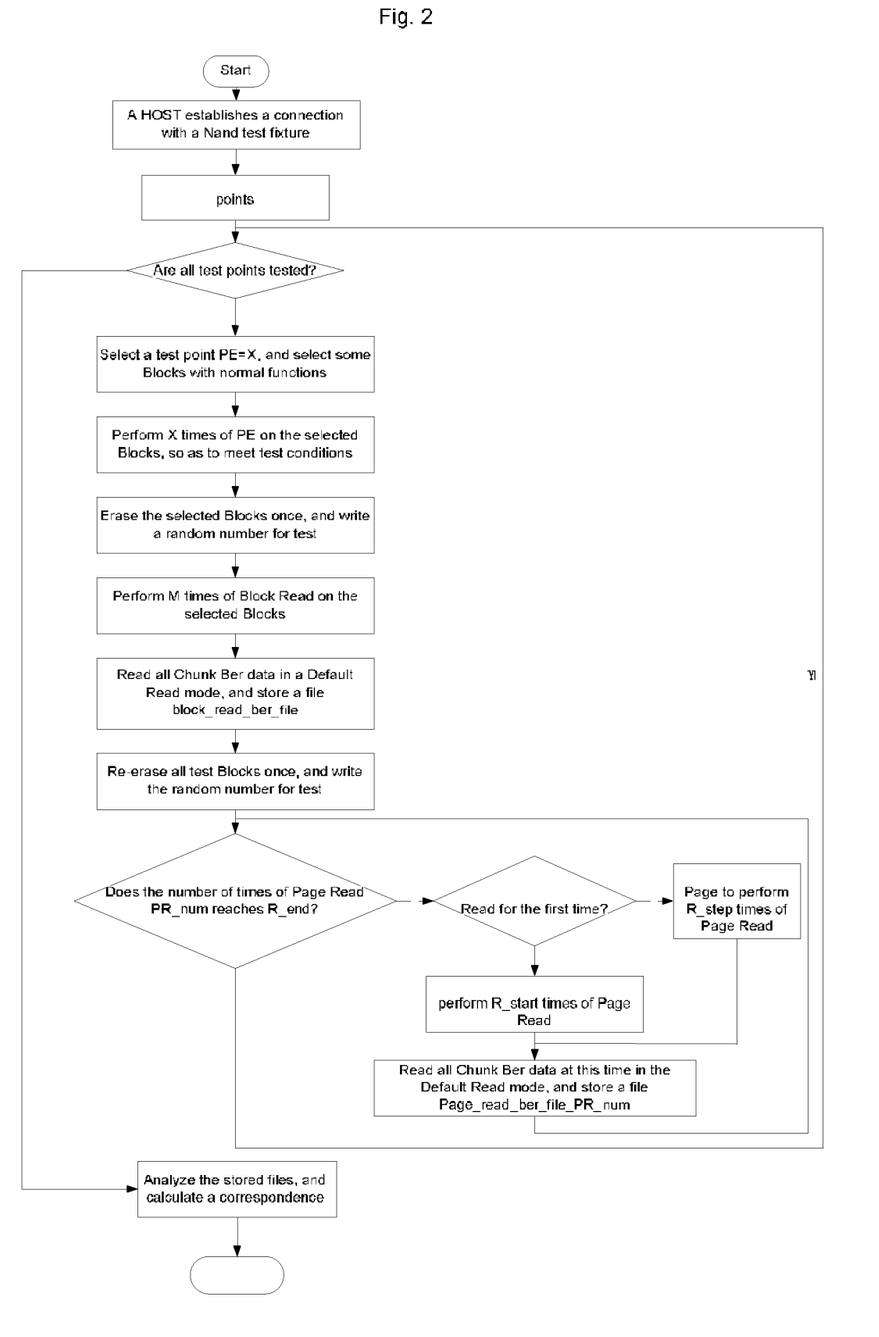
FIG. 2 is a schematic diagram of a test logic provided in an embodiment of the present disclosure.

As shown in FIG. 1 and FIG. 2, the present disclosure discloses a method for testing a conversion relationship between block reading and page reading in a flash memory chip. The method includes the following operations:

S1, a random number is written to obtain a test sample block, M times of block reading are performed on the test sample block, first BER information is recorded, and the first BER information is stored as a block reading bit error rate file;

S2, a test starting point value, a test ending point value and a test step length value are determined, pages from N pages in the block are randomly selected, page reading of which the number of times is equal to the test starting point value are performed, second BER information is recorded, and the second BER information is stored as a page reading bit error rate file;

S3, pages are randomly selected, page reading of which the number of times is equal to the test step length value are performed, third BER information is recorded, and the third BER information is stored as a page reading bit error rate file; and the S3 is repeatedly executed for the number of times of $$\frac{\text{the test ending point value} - \text{the test starting point value}}{\text{the test step length value}};$$

S4, the block reading bit error rate file and a plurality of the page reading bit error rate files are analyzed, a bit error rate threshold value is set, the number of bit error rates greater than the threshold value in the block reading bit error rate file, and a proportion P_br as reference values are calculated; and the number of bit error rates greater than the threshold value in each of the plurality of the page reading bit error rate files and a proportion P_pr_num are calculated, and in a case that the difference value between the P_br and P_pr_num is the minimum, the number of times of page reading PR_num_similar is recorded under the page reading bit error rate file; and S5, a conversion coefficient of block reading and page reading at the current number of times of erasure is calculated.

Before the test, a link between a HOST and a test fixture for a flash memory chip is established, the flash memory chip test fixture may implement various operations on the chip, such as reading, writing, erasing, BER statistics and the like, a test program is run in the HOST, the whole test process is controlled, a running log is recorded, test data is generated and issued, an operation result is recorded, collected BER data is analyzed, etc.

In order to enable a test result to satisfy the entire life cycle of the flash memory chip, blocks in different life cycle states are respectively tested.

Test points are selected, if the block supports 3000 times of PE erasure, then 1000 is taken as a step length, the conditions of PE0, PE1000, PE2000 and PE3000 are respectively tested, or the division is more detailed, for example, the step length is 500, depending on actual needs.

After the test points are selected, the test points are tested one by one.

An unused block with a normal function is selected, that is, a block whose PE is 0, the block is erased once, a random number for test is written into the block, then M times of block reading is performed on the test sample, M represents the maximum number of times of reading supported by the flash memory chip, if exceeding this value, the BER rises to cause an en error in ECC, all test blocks are read in a default reading mode, BER information is recorded in units of data Chunk, the size of Chunk may be ¼ of the size of a page, that is, one page is divided into four Chunks, and the Chunks are stored as a block reading bit error rate file.

All test blocks are erased once, so as to eliminate the influence of reading interference, page reading BER data collection is performed, and the page reading BER data collection process is as a test ending point is calculated, and if the number of pages in the block is N, for the comprehensiveness of the test data, the ending point is recorded as 2*M*N times of page reading; a test starting point is determined, and the test starting point is defined as 0.5*M*N times of page reading according to experience and test efficiency; a test step length is determined, that is, test accuracy, in order to give consideration to efficiency and accuracy, a step length of 10*N times of page reading is selected, some pages are randomly selected, these pages are read for 0.5*M*N times in total, then all test blocks are read in a default mode, second BER information is recorded, and the second BER information is stored as a page reading bit error rate file; then, some pages are randomly selected, these pages are read for 10*N times in total, wherein the cumulative number of times is 0.5*M*N+10*N at this time; and then, all test blocks are read in the default mode, third BER information is recorded, and the third BER information is stored as a page reading bit error rate file, the process is circularly executed until the number of times of page reading is not less than 2*M*N, and at this time, the number of jointly stored page reading files is:

$$1 + \frac{2*M*N - 0.5*M*N}{10*N};$$

and the collected block read bit error rate file and the page read bit error rate file are analyzed, a BER threshold value is set, the number of Chunks with bit error rates greater than the threshold value in the block reading bit error rate file is analyzed, a proportion of block bit error rates is calculated as a reference value; the number of Chunks with bit error rates greater than the threshold value in each page reading bit error rate file is analyzed, and a proportion of page bit error rates are calculated; data closest to the proportion of block bit error rates is find in the proportion of page bit error rates, that is, the number of times of page reading PR_num_similar under the proportion data is closest to the M times of block reading, wherein a formula of the conversion coefficient is:

$$\alpha = \frac{\text{PR\_num\_similar}}{N}; \text{ and}$$

the process is circularly executed until all test points are tested.

In the embodiments of the present disclosure, the block reading is to read all pages in the block once; and the page reading is to read one page once in the block.

In the embodiments of the present disclosure, by means of selecting test points, block reading is performed respectively, the bit error rate file is recorded, the test starting point, the test ending point and the test step length are set in the block, the bit error rate file of the number of times of corresponding page reading is recorded respectively, and the number of times of page reading that is closest to the proportion of block error codes is find from the proportion of page error codes, the conversion of the number of times of block reading and the number of times of page reading is completed, conversion coefficients of block reading and page reading can be calculated for blocks in different states of a life cycle, and a certain block and the number of times of block reading can be recorded more accurately in firmware, thereby migrating data in the block when the threshold value is reached, the probability of hard solution is reduced, and the efficiency is improved.

Figure 3:
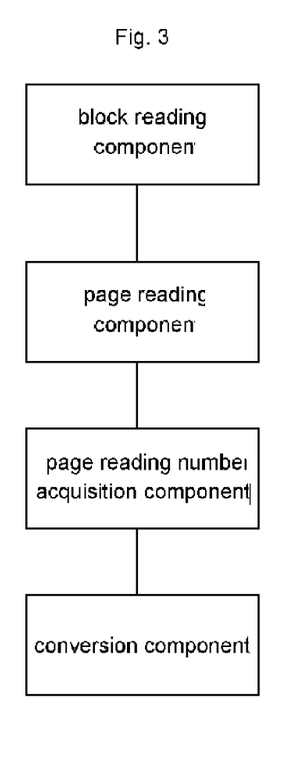
FIG. 3 is a block diagram of a system for testing a conversion relationship between block reading and page reading in a flash memory chip provided in an embodiment of the present disclosure.

As shown in FIG. 3, the embodiments of the present disclosure further discloses a system for testing a conversion relationship between block reading and page reading in a flash memory chip. The system includes:

a block reading component, configured to write a random number to obtain a test sample block, perform M times of block reading on the test sample block, record first BER information, and store the first BER information as a block reading bit error rate file;

a page reading component, configured to determine a test starting point value, a test ending point value and a test step length value, randomly select pages from N pages in the block, perform page reading of which the number of times is equal to the test starting point value, record second BER information, and store the second BER information as a page reading bit error rate file; and randomly select pages, perform page reading of which the number of times is equal to the test step length value, record third BER information, store the third BER information as a plurality of page reading bit error rate files, and repeatedly execute the operations for the number of times of times of the $$\frac{\text{the test ending point value} - \text{the test starting point value}}{\text{the test step length value}};$$

a page reading number acquisition component, configured to analyze the block reading bit error rate file and the plurality of the page reading bit error rate files, set a bit error rate threshold value, calculate the number of bit error rates greater than the threshold value in the block reading bit error rate file, and a proportion P_br as reference values; and calculate the number of bit error rates greater than the threshold value in each of the plurality of the page reading bit error rate files, and a proportion P_pr_num, and in a case that the difference value between the P_br and P_pr_num is the minimum, record the number of times of page reading PR_num_similar under the page reading bit error rate file; and a conversion component, configured to calculate a conversion coefficient of block reading and page reading at the current number of times of erasure.

Test points are selected, if the block supports 3000 times of PE erasure, then 1000 is taken as a step length, the conditions of PE0, PE1000, PE2000 and PE3000 are respectively tested, or the division is more detailed, for example, the step length is 500, depending on actual needs.

After the test points are selected, the test points are tested one by one.

An unused block with a normal function is selected, that is, a block whose PE is 0, the block is erased once, a random number for test is written into the block, then M times of block reading is performed on the test sample, M represents the maximum number of times of reading supported by the flash memory chip, if exceeding this value, the BER rises to cause an en error in ECC, all test blocks are read in a default reading mode, BER information is recorded in units of data Chunk, the size of Chunk may be ¼ of the size of a page, that is, one page is divided into four Chunks, and the Chunks are stored as a block reading bit error rate file.

All test blocks are erased once, so as to eliminate the influence of reading interference, page reading BER data collection is performed, and the page reading BER data collection process is as follows:

a test ending point is calculated, and if the number of pages in the block is N, for the comprehensiveness of the test data, the ending point is recorded as 2*M*N times of page reading; a test starting point is determined, and the test starting point is defined as 0.5*M*N times of page reading according to experience and test efficiency; a test step length is determined, that is, test accuracy, in order to give consideration to efficiency and accuracy, a step length of 10*N times of page reading is selected, some pages are randomly selected, these pages are read for 0.5*M*N times in total, then all test blocks are read in a default mode, second BER information is recorded, and the second BER information is stored as a page reading bit error rate file; then, some pages are randomly selected, these pages are read for 10*N times in total, wherein the cumulative number of times is 0.5*M*N+10*N at this time; and then, all test blocks are read in the default mode, third BER information is recorded, and the third BER information is stored as a page reading bit error rate file, the process is circularly executed until the number of times of page reading is not less than 2*M*N, and at this time, the number of jointly stored page reading files is:

$$1 + \frac{2*M*N - 0.5*M*N}{10*N};$$

the collected block read bit error rate file and the page read bit error rate file are analyzed, a BER threshold value is set, the number of Chunks with bit error rates greater than the threshold value in the block reading bit error rate file is analyzed, a proportion of block bit error rates is calculated as a reference value; the number of Chunks with bit error rates greater than the threshold value in each page reading bit error rate file is analyzed, and a proportion of page bit error rates are calculated; data closest to the proportion of block bit error rates is find in the proportion of page bit error rates, that is, the number of times of page reading PR_num_similar under the proportion data is closest to the M times of block reading, wherein a formula of the conversion coefficient is:

$$\alpha = \frac{\text{PR\_num\_similar}}{N};$$

and the process is circularly executed until all test points are tested.

The embodiments of the present disclosure further provide a device for testing a conversion relationship between block reading and page reading in a flash memory chip, including:

a memory, configured to store a computer program; and
a processor, configured to execute the computer program, so as to implement operations of the method for testing the conversion relationship between the block reading and the page reading in the flash memory chip.

The embodiments of the present disclosure further provide a readable storage medium, for storing a computer program, wherein when executed by a processor, the computer program implements operations of the method for testing the conversion relationship between the block reading and the page reading in the flash memory chip.

The above descriptions are only preferred embodiments of the present disclosure, and are not intended to limit the present disclosure, and any modifications, equivalent replacements, improvements and the like, made within the spirit and principles of the present disclosure, shall be included in the protection scope of the present disclosure.

Finally, it should be noted that a person of ordinary skill in the art would understand that all or some processes of the methods in the described embodiments may be completed by computer-readable instructions instructing relevant hardware. The program may be stored in a computer readable storage medium, and when the program is executed, the processes of the embodiments of the method may be included.

Furthermore, it should be appreciated that a computer-readable storage medium (e.g., memory) herein may be a volatile memory or a non-volatile memory, or may include both a volatile memory and a non-volatile memory.

It will be apparent to a person skilled in the art that the various illustrative logical blocks, components, circuits, and algorithm steps described in combination with the embodiments disclosed herein may be implemented by electronic hardware, or a combination of computer software and electronic hardware. To clearly describe the interchangeability between the hardware and the software, illustrative components, blocks, components, circuits, and steps have been described generally in terms of their functions. Whether such functions are implemented as software or hardware depends upon the particular application and design constraints imposed on the overall system. The functions may be implemented in various ways by a person skilled in the art for each particular application, but such implementation decisions should not be interpreted as causing a departure from the scope of the disclosure of embodiments of the present disclosure.

The invention claimed is:

1. A method for testing a conversion relationship between block reading and page reading in a flash memory chip, comprising:
   writing random numbers to obtain a test sample block, performing M times of block reading on the test sample block, recording first BER information, and storing the first BER information as a block reading bit error rate file, wherein M represents the maximum number of times of reading supported by the flash memory chip;
   determining a test starting point value, a test ending point value and a test step length value, randomly selecting pages from N pages in the test sample block, performing page reading of which number of times is equal to the test starting point value, recording second BER information, and storing the second BER information as a page reading bit error rate file;
   randomly selecting pages, performing page reading of which the number of times is equal to the test step length value, recording third BER information, and storing the third BER information as the page reading bit error rate file; and repeatedly executing the following steps for the number of times of $$\frac{\text{the test ending point value} - \text{the test starting point value}}{\text{the test step length value}}$$

randomly selecting the pages, performing the page reading of which the number of times is equal to the test step length value, recording the third BER information, and storing the third BER information as the page reading bit error rate file;
   analyzing the block reading bit error rate file and a plurality of page reading bit error rate files, setting a bit error rate threshold value, calculating the number of bit error rates greater than the bit error rate threshold value in the block reading bit error rate file and a proportion P_br, as reference values; and calculating number of bit error rates greater than the bit error rate threshold value in each of the plurality of the page reading bit error rate files and a proportion P_pr_num, and in a case that a difference value between the P_br and P_pr_num is the minimum, recording the number of times of page reading PR_num_similar under the page reading bit error rate file; and
   calculating a conversion coefficient of the block reading and the page reading at current number of times of erasure.

2. The method for testing the conversion relationship between the block reading and the page reading in the flash memory chip as claimed in claim 1, wherein the test starting point value is 0.5*M*N, the test ending point value is 2*M*N, and the test step length value is 10*N.

3. The method for testing the conversion relationship between the block reading and the page reading in the flash memory chip as claimed in claim 1, wherein before the page reading is performed; the test sample block needs to be erased once, so as to eliminate reading interference.

4. The method for testing the conversion relationship between the block reading and the page reading in the flash memory chip as claimed in claim 1, wherein a calculation formula of the conversion coefficient is:

$$\alpha = \frac{\text{PR\_num\_similar}}{N}.$$

5. A device for testing a conversion relationship between block reading and page reading in a flash memory chip, comprising:
   a memory, configured to store a computer program; and
   a processor, configured to execute the computer program, so as to:
   write random numbers to obtain a test sample block, perform M times of block reading on the test sample block, record first BER information, and store the first BER information as a block reading bit error rate file, wherein M represents the maximum number of times of reading supported by the flash memory chip;
   determine a test starting point value, a test ending point value and a test step length value, randomly select pages from N pages in the test sample block, perform page reading of which number of times is equal to the test starting point value, record second BER information, and store the second BER information as a page reading bit error rate file;
   randomly select pages, perform page reading of which the number of times is equal to the test step length value, record third BER information, and store the third BER information as the page reading bit error rate file; and repeatedly execute the following steps for the number of times of $$\frac{\text{the test ending point value} - \text{the test starting point value}}{\text{the test step length value}}$$

randomly selecting the pages, performing the page reading of which the number of times is equal to the test step length value, recording the third BER information, and storing the third BER information as the page reading bit error rate file;
   analyze the block reading bit error rate file and a plurality of page reading bit error rate files, set a bit error rate threshold value, calculate the number of bit error rates greater than the bit error rate threshold value in the block reading bit error rate file and a proportion P_br, as reference values; and calculate number of bit error rates greater than the bit error rate threshold value in each of the plurality of the page reading bit error rate files and a proportion P_pr_num, and in a case that a difference value between the P_br and P_pr_num is the minimum, record the number of times of page reading PR_num_similar under the page reading bit error rate file; and
   calculate a conversion coefficient of the block reading and the page reading at current number of times of erasure.

6. A readable storage medium, for storing a computer program, wherein when executed by a processor, the computer program is configured to cause the at least one processor to:

write random numbers to obtain a test sample block, perform M times of block reading on the test sample block, record first BER information, and store the first BER information as a block reading bit error rate file, wherein M represents the maximum number of times of reading supported by the flash memory chip;

determine a test starting point value, a test ending point value and a test step length value, randomly select pages from N pages in the test sample block, perform page reading of which number of times is equal to the test starting point value, record second BER information, and store the second BER information as a page reading bit error rate file;

randomly select pages, perform page reading of which the number of times is equal to the test step length value, record third BER information, and store the third BER information as the page reading bit error rate file; and repeatedly execute the following steps for the number of times of $$\frac{\text{the test ending point value} - \text{the test starting point value}}{\text{the test step length value}}$$

randomly selecting the pages, performing the page reading of which the number of times is equal to the test step length value, recording the third BER information, and storing the third BER information as the page reading bit error rate file;

analyze the block reading bit error rate file and a plurality of page reading bit error rate files, set a bit error rate threshold value, calculate the number of bit error rates greater than the bit error rate threshold value in the block reading bit error rate file and a proportion P_br, as reference values; and calculate number of bit error rates greater than the bit error rate threshold value in each of the plurality of the page reading bit error rate files and a proportion P_pr_num, and in a case that a difference value between the P_br and P_pr_num is the minimum, record the number of times of page reading PR_num_similar under the page reading bit error rate file; and calculate a conversion coefficient of the block reading and the page reading at current number of times of erasure.

7. The method for testing the conversion relationship between the block reading and the page reading in the flash memory chip as claimed in claim 1, further comprising:

establishing a link between a HOST and a test fixture for the flash memory chip, wherein, the flash memory chip test fixture is configured to implement various operations on the flash memory chip, a test program is run in the HOST, and whole test process is controlled by the HOST.

8. The method for testing the conversion relationship between the block reading and the page reading in the flash memory chip as claimed in claim 7, wherein, the various operations comprises: reading, writing, erasing, and BER statistics.

9. The method for testing the conversion relationship between the block reading and the page reading in the flash memory chip as claimed in claim 7, wherein, in the HOST, a running log is recorded, test data is generated and issued, an operation result is recorded, collected BER data is analyzed.

10. The method for testing the conversion relationship between the block reading and the page reading in the flash memory chip as claimed in claim 1, wherein, blocks in different life cycle states of the flash memory chip are respectively tested.

11. The method for testing the conversion relationship between the block reading and the page reading in the flash memory chip as claimed in claim 10, wherein, the blocks in the different life cycle states of the flash memory chip are respectively tested, comprises:

selecting test points;

after the test points are selected, testing the test points one by one.

12. The method for testing the conversion relationship between the block reading and the page reading in the flash memory chip as claimed in claim 11, wherein, selecting the test point, comprises:

in a case that a block supports 3000 times of PE erasure, taking 1000 as a step length, respectively testing the conditions of PE0, PE1000, PE2000 and PE3000.

13. The method for testing the conversion relationship between the block reading and the page reading in the flash memory chip as claimed in claim 1, wherein, M represents the maximum number of times of reading supported by the flash memory chip.

14. The method for testing the conversion relationship between the block reading and the page reading in the flash memory chip as claimed in claim 1, wherein, recording the first BER information, comprises:

recording the first BER information in units of data Chunk, wherein, the size of the data Chunk is ¼ of the size of a page.

15. The device for testing a conversion relationship between the block reading and the page reading in a flash memory chip as claimed in claim 5, wherein the test starting point value is 0.5*M*N, the test ending point value is 2*M*N, and the test step length value is 10*N.

16. The device for testing a conversion relationship between the block reading and the page reading in a flash memory chip as claimed in claim 5, wherein before the page reading is performed; the test sample block needs to be erased once, so as to eliminate reading interference.

17. The device for testing a conversion relationship between the block reading and the page reading in a flash memory chip as claimed in claim 5, wherein a calculation formula of the conversion coefficient is:

$$\alpha = \frac{\text{PR\_num\_similar}}{N}.$$

18. The readable storage medium as claimed in claim 6, wherein the test starting point value is 0.5*M*N, the test ending point value is 2*M*N, and the test step length value is 10*N.

19. The readable storage medium as claimed in claim 6, wherein before the page reading is performed; the test sample block needs to be erased once, so as to eliminate reading interference.

20. The readable storage medium as claimed in claim 6, wherein a calculation formula of the conversion coefficient is:

$$\alpha = \frac{\text{PR\_num\_similar}}{N}.$$

* * * * *